(12) United States Patent
Liberg et al.

(10) Patent No.: US 11,991,710 B2
(45) Date of Patent: May 21, 2024

(54) DUTY CYCLE AWARE SCHEDULING FOR WIRELESS NETWORKS

(71) Applicant: Telefonaktiebolaget LM Ericsson (publ), Stockholm (SE)

(72) Inventors: Olof Liberg, Enskede (SE); David Sugirtharaj, Lund (SE); Emma Wittenmark, Lund (SE); Mai-Anh Phan, Herzogenrath (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 374 days.

(21) Appl. No.: 17/277,381

(22) PCT Filed: Sep. 13, 2019

(86) PCT No.: PCT/SE2019/050866
§ 371 (c)(1),
(2) Date: Mar. 18, 2021

(87) PCT Pub. No.: WO2020/060470
PCT Pub. Date: Mar. 26, 2020

(65) Prior Publication Data
US 2021/0360677 A1 Nov. 18, 2021

Related U.S. Application Data

(60) Provisional application No. 62/733,298, filed on Sep. 19, 2018.

(51) Int. Cl.
*H04W 72/23* (2023.01)
*H04L 1/1867* (2023.01)
(Continued)

(52) U.S. Cl.
CPC ........... *H04W 72/23* (2023.01); *H04L 1/1887* (2013.01); *H04W 24/02* (2013.01);
(Continued)

(58) Field of Classification Search
CPC . H04W 72/23; H04W 24/02; H04W 52/0216; H04W 72/569; H04W 76/28;
(Continued)

(56) References Cited

U.S. PATENT DOCUMENTS 10,880,883 B2 12/2020 Bhushan et al.
2008/0159184 A1* 7/2008 Niwano .............. H04W 52/346
370/278

(Continued)

FOREIGN PATENT DOCUMENTS

CN 106605441 A 4/2017
EP 3331187 A1 * 6/2018 ............. H04L 1/187
(Continued)

*Primary Examiner* — Ayanah S George
(74) *Attorney, Agent, or Firm* — COATS & BENNETT, PLLC

(57) ABSTRACT

New signaling is defined from wireless devices (10) to a wireless communication network, concerning the wireless devices' duty cycle statuses. This allows the network to optimize its control of the radio resource usage. Additionally, embodiments described herein provide new signalling from the network to wireless devices concerning the network's duty cycle status. This allows wireless devices (10) to optimize their idle mode operation, including decisions whether to request a connection setup or remain in idle mode. Embodiments described and claimed herein provide a set of simple methods for operating a cellular system in a duty cycle controlled radio frequency band.

20 Claims, 17 Drawing Sheets

(51) Int. Cl.
    *H04W 24/02*     (2009.01)
    *H04W 52/02*     (2009.01)
    *H04W 72/566*     (2023.01)
    *H04W 76/28*     (2018.01)

(52) U.S. Cl.
    CPC ..... *H04W 52/0216* (2013.01); *H04W 72/569* (2023.01); *H04W 76/28* (2018.02)

(58) Field of Classification Search
    CPC .... H04W 76/19; H04L 1/1887; H04L 1/1854; H04L 1/1864; Y02D 30/70
    See application file for complete search history.

(56) References Cited

U.S. PATENT DOCUMENTS

| | | |
|---|---|---|
| 2018/0070243 A1 | 3/2018 | Liu et al. |
| 2018/0124705 A1* | 5/2018 | Su .................... H04W 52/0277 |
| 2019/0357270 A1* | 11/2019 | Kurth .................... H04W 48/10 |

FOREIGN PATENT DOCUMENTS

| | | |
|---|---|---|
| EP | 3331187 A1 | 6/2018 |
| WO | 2017151026 A1 | 9/2017 |
| WO | 2018138328 A1 | 8/2018 |

* cited by examiner

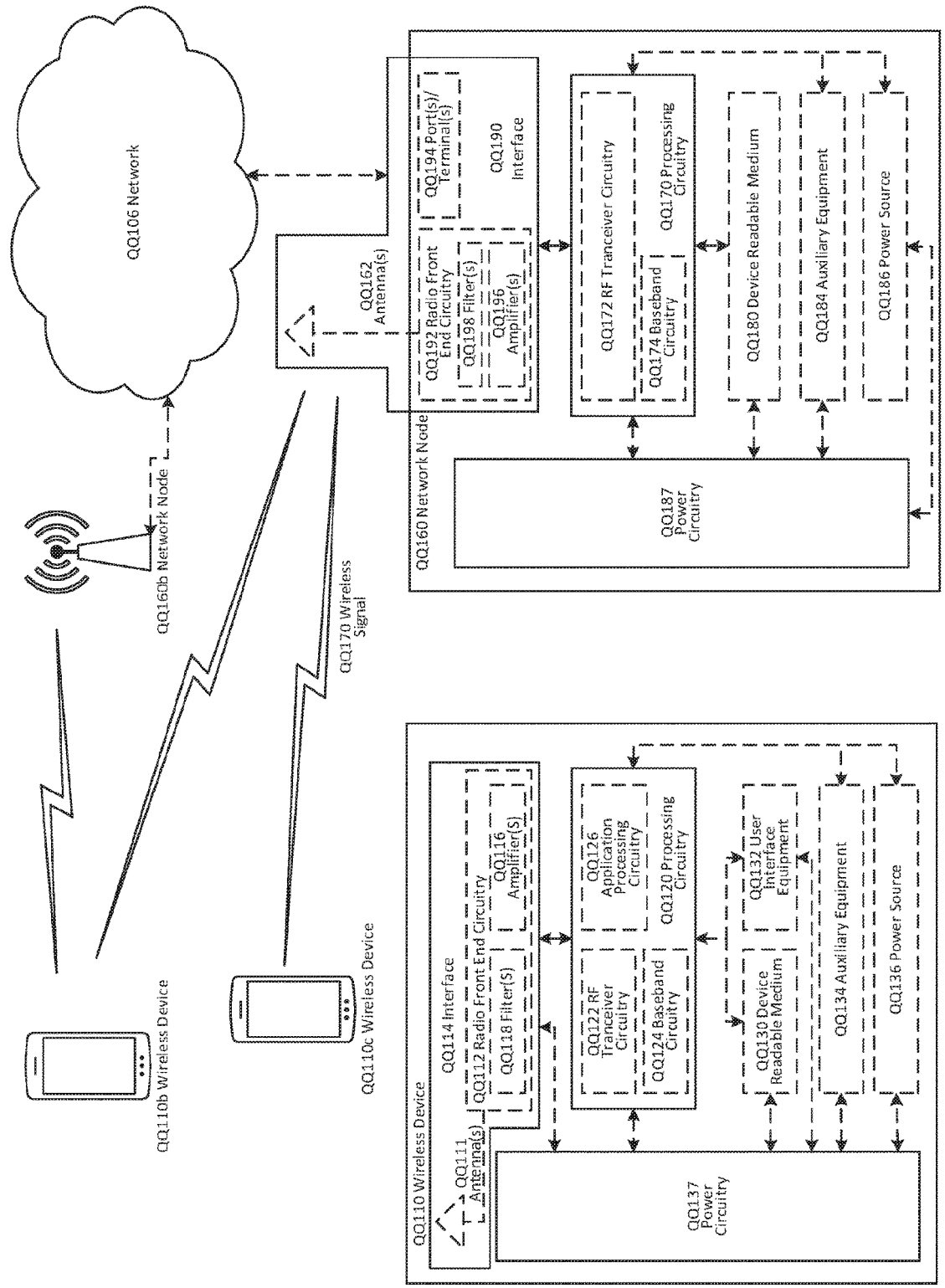
Figure QQ1

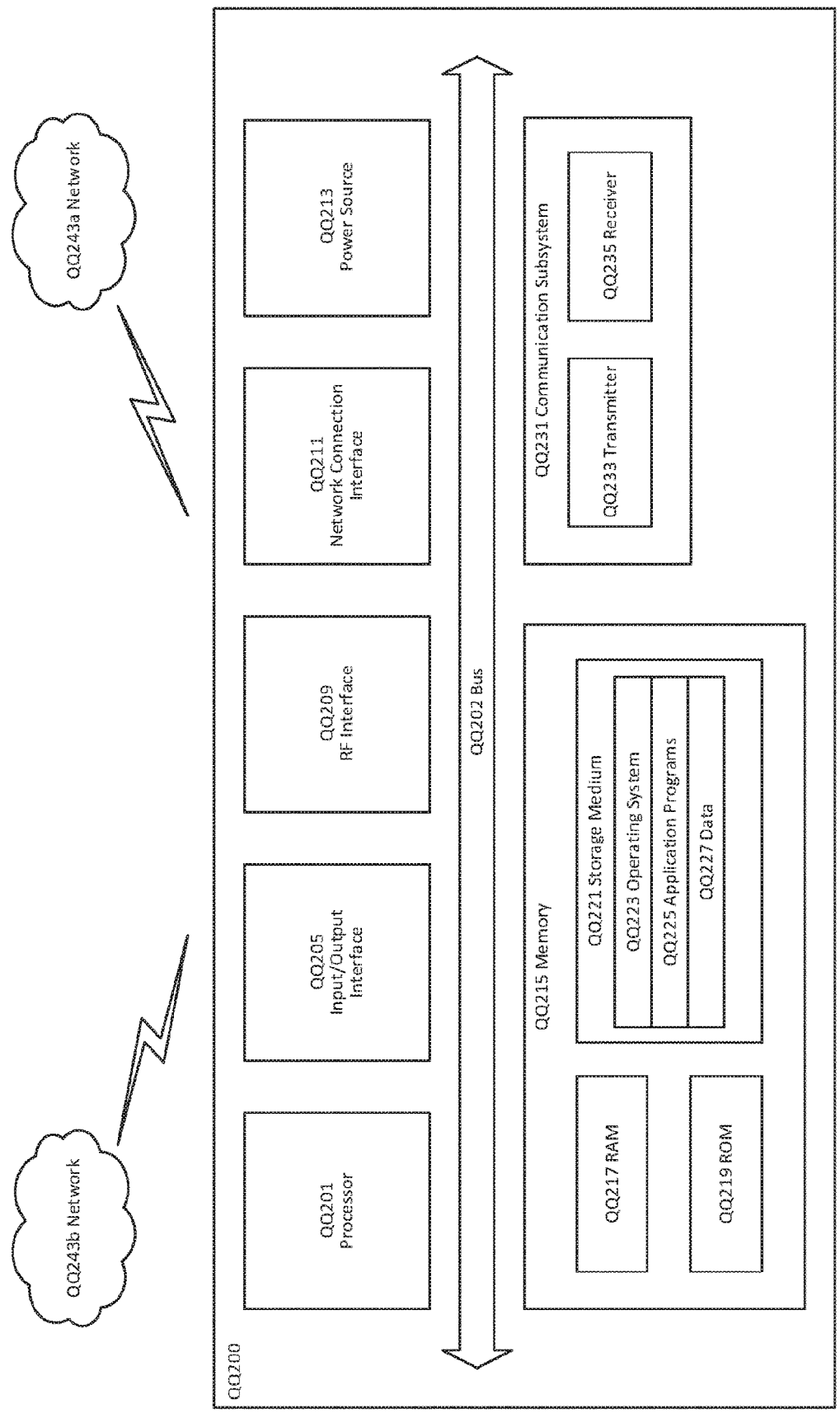
Figure QQ2

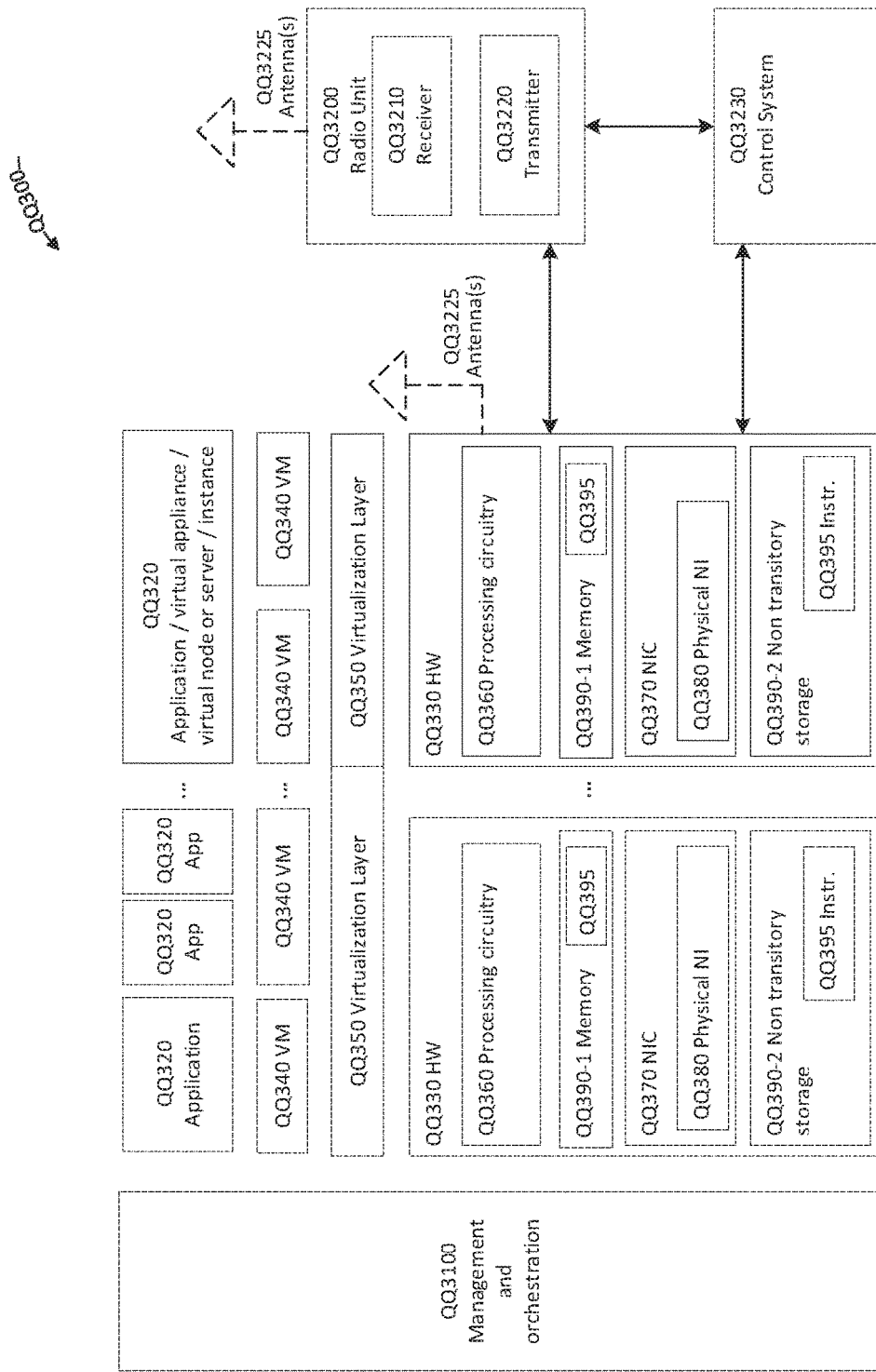
Figure QQ3

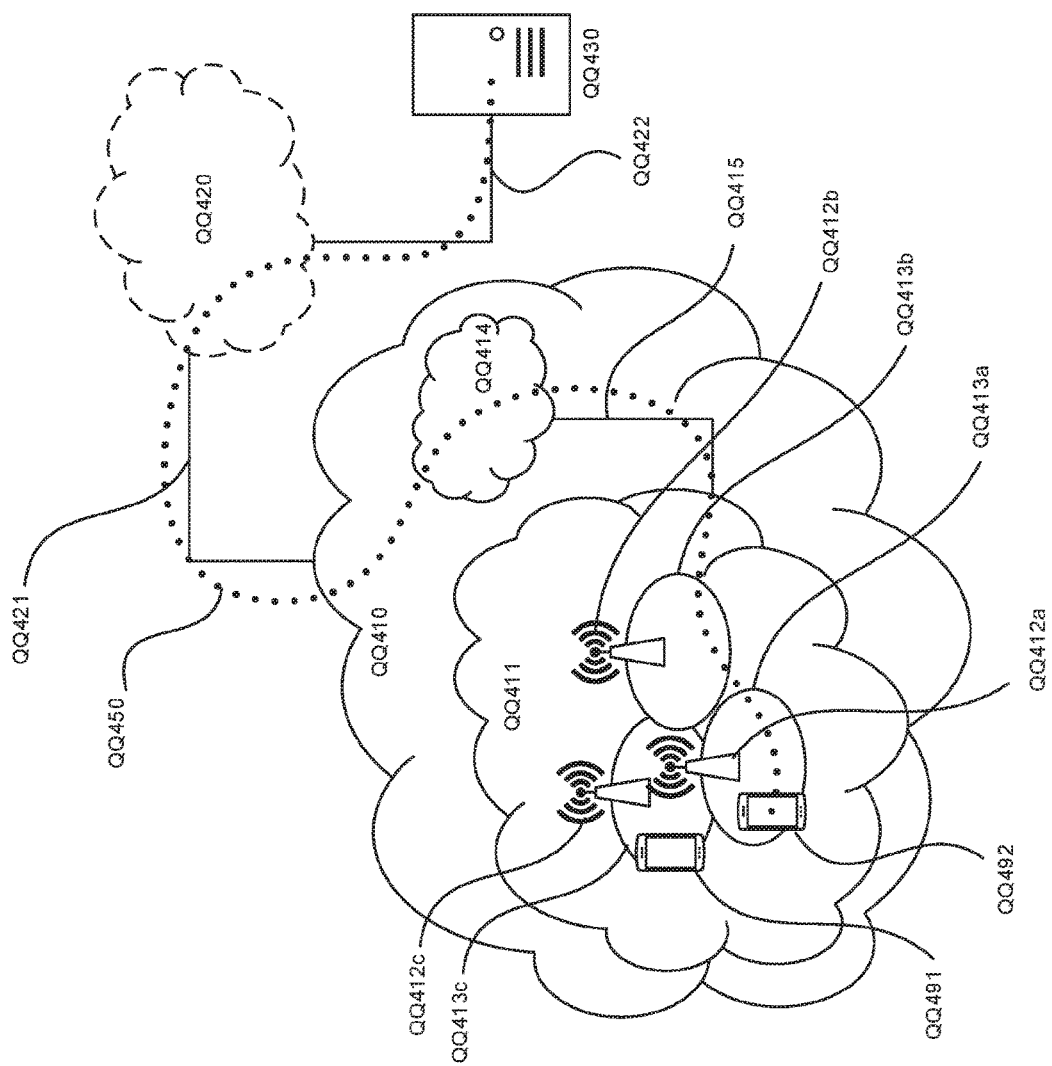
Figure QQ4

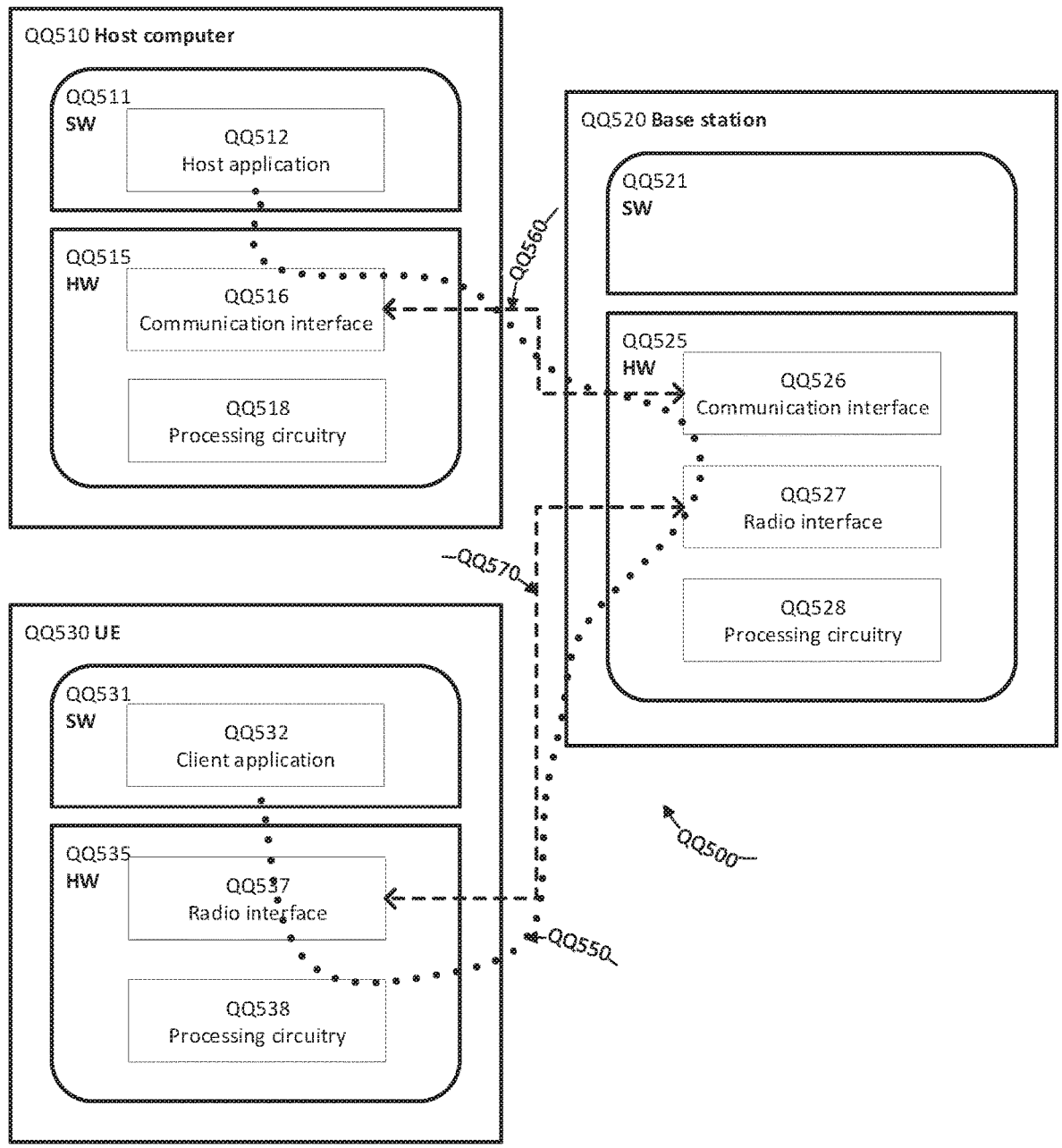
Figure QQ5

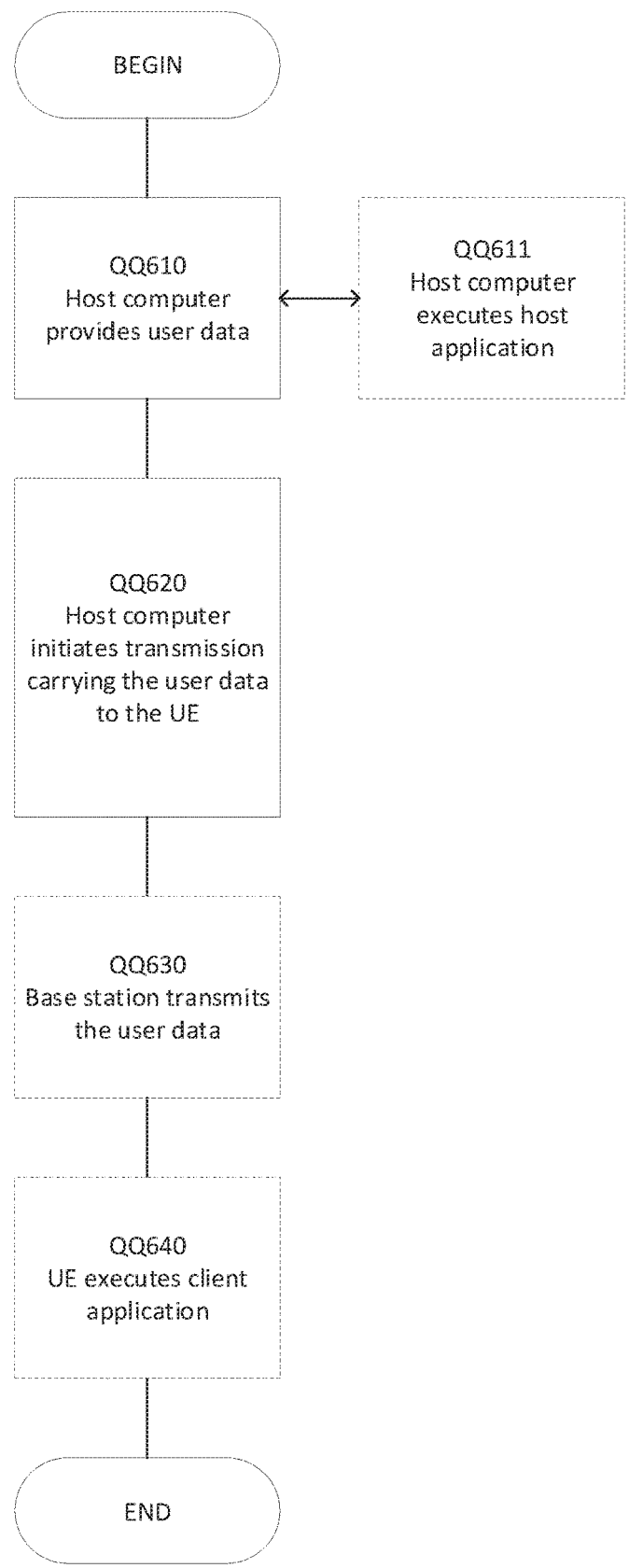
Figure QQ6

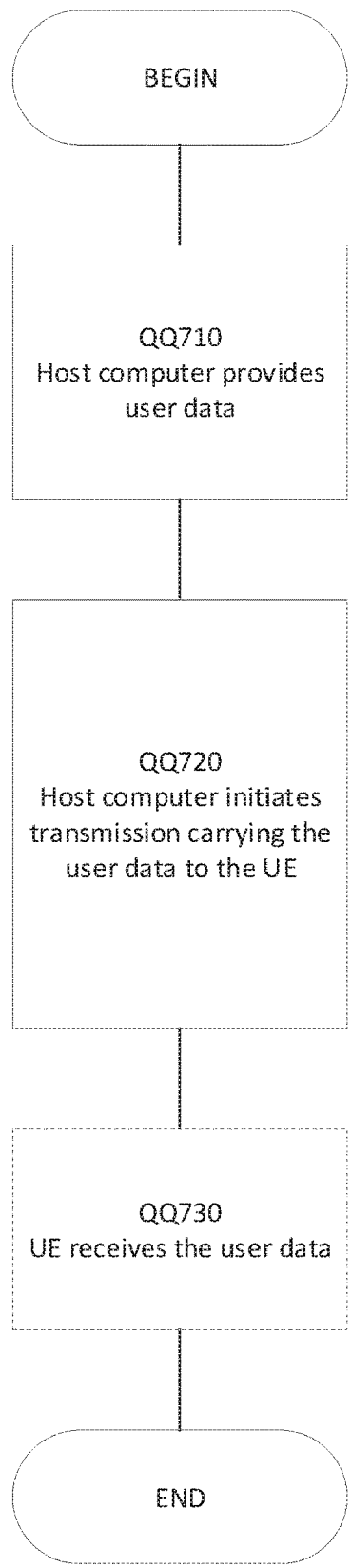
Figure QQ7

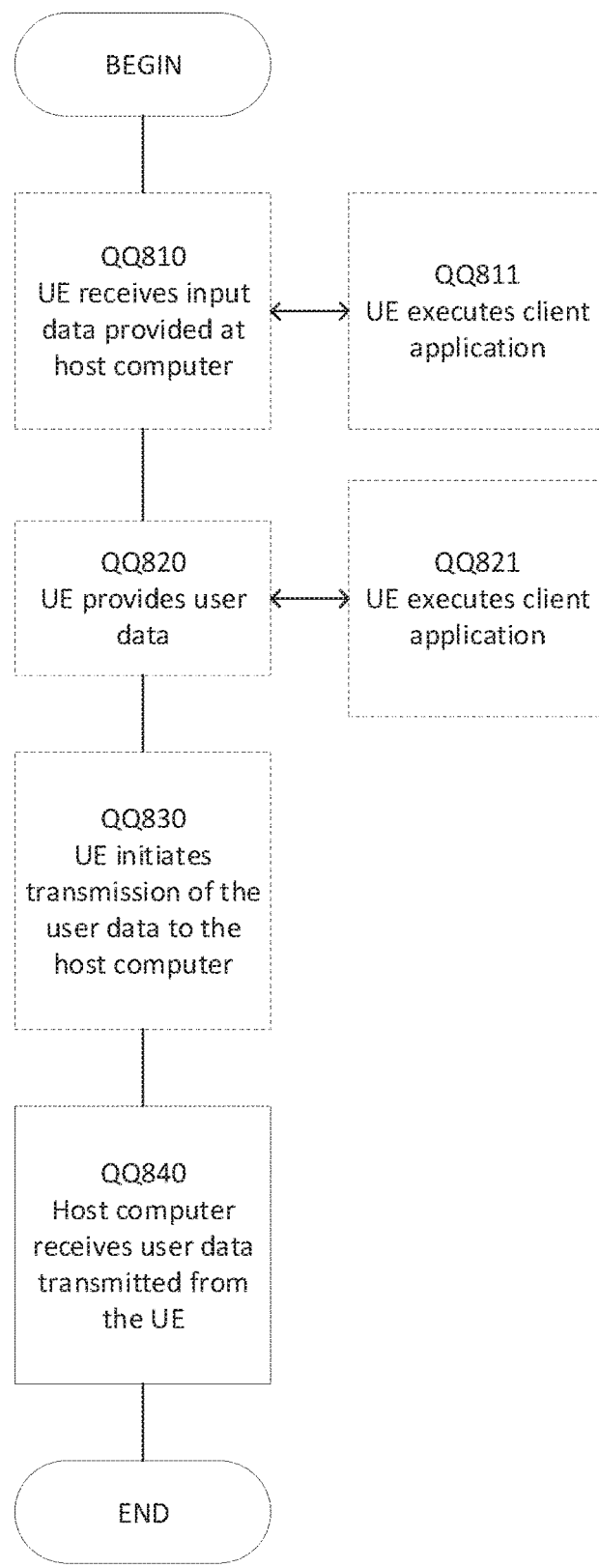
Figure QQ8

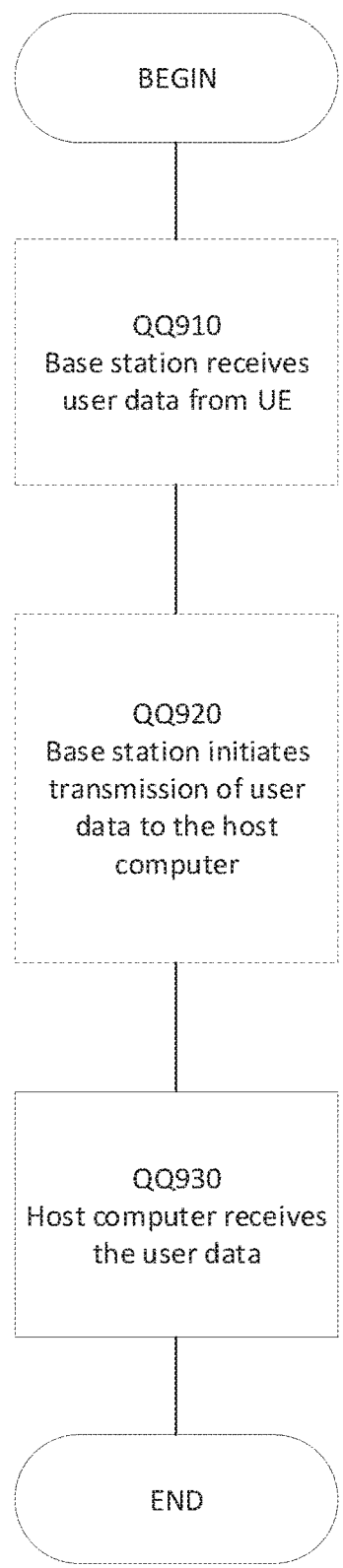
Figure QQ9

DUTY CYCLE AWARE SCHEDULING FOR WIRELESS NETWORKS

FIELD OF INVENTION

The present invention relates generally to wireless communication networks, and in particular to efficient operation in wireless communication networks that impose duty cycle limitations.

BACKGROUND

Wireless communication networks, enabling voice and data communications to wireless devices (which may be mobile), are ubiquitous in many parts of the world, and continue to advance in technological sophistication, system capacity, data rates, bandwidth, supported services, and the like. A basic model of one type of wireless networks, generally known as "cellular," features a plurality of fixed network nodes (known variously as base station, radio base station, base transceiver station, serving node, NodeB, eNodeB, eNB, and the like), each providing wireless communication service to a large plurality of wireless devices (known variously as mobile terminals, User Equipment or UE, and the like) within a generally fixed geographical area, known as a cell or sector.

While one aspect of wireless communication development is towards ever-higher bandwidth and data rates (e.g., supporting a wide variety of services delivered to sophisticated wireless devices such as "smartphones"), another recent development is in the opposite direction—providing limited-bandwidth, low-data-rate service to simple, cheap devices with very low power budgets. In Release 13, the Third Generation Partnership Project (3GPP) standardized two different approaches to this so-called "machine type communications" or MTC. Enhanced MTC (eMTC), also known as Long Term Evolution-Machine-to-machine (LTE-M), includes cost reduction measures such as lower bandwidth, lower data rates, and reduced transmit power, as compared to legacy (broadband) LTE. NarrowBand Internet of Things (NB-IoT) more aggressively addresses the extremely low cost market with less than 200 KHz of spectrum and flexibility to deploy concurrently with legacy networks or outside of active legacy spectrum. NB-IoT targets improved indoor coverage, support for massive numbers of low throughput devices, low delay sensitivity, ultra-low device cost, and low device power consumption.

The Multefire Alliance (MFA), is now in 2018 adapting NB-IoT for operation in unlicensed spectrum. In a first release NB-IoT will be made available in US and in EU, in the 800 and 900 MHz frequency bands.

In EU, ETSI are defining the regulations for equipment operating in unlicensed spectrum. One important regulation is the Duty Cycle requirement. Either or both of a base station and a wireless device may be assigned a duty cycle. It defines the allowed equipment activity level. In particular, as used herein, the term "activity duty cycle" or just "duty cycle" means the ratio, expressed as a percentage, of the cumulative duration of transmissions within an observation interval. For example, a base station or wireless device limited to transmitting a cumulative total of six minutes over an hour would have a 10% duty cycle. However, in some cases, as explained herein, the network may configure that acknowledgements received in response to a transmission (e.g., HARQ ACK/NAKs) are also counted into the duty cycle, even though the equipment (i.e., base station or wireless device) is receiving and not transmitting the acknowledgements.

In the bands targeted by NB-IoT, wireless devices transmitting in the uplink direction are expected to be allowed to use a duty cycle in the range of at most 10% for band 54, while it is only 2.5% for band 47b. There are also other frequency bands in the 900 MHz region which only allow a duty cycle of 1%. Depending on the frequency band used, this implies that a wireless device may transmit during 360 s or 90 s every hour. In the downlink, it is expected that the base station will be permitted to transmit to all wireless devices cumulatively during a duty cycle in the range of 10%. The base station is hence permitted to transmit for 360 seconds per hour.

The duty cycle restriction imposed on a wireless device is partly transparent to the base station, which is in control of the configuration and scheduling of the radio resources. There are transmissions from a wireless device which might not be known to the base stations, such as random access attempts during the connection setup procedure. These transmissions are also counted in the duty cycle of the wireless device. However, if the duty cycle limit is reached, a wireless device may, e.g., drop an ongoing connection, without notifying the base station. This may lead to a wasteful usage of radio resources.

A base station may likewise be forced to drop ongoing connections and bar the cell from new access attempts, due to a duty cycle limitation applied to the base station. This may again lead to wasteful radio resource usage.

The Background section of this document is provided to place embodiments of the present invention in technological and operational context, to assist those of skill in the art in understanding their scope and utility. Approaches described in the Background section could be pursued, but are not necessarily approaches that have been previously conceived or pursued. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later According to one or more embodiments described and claimed herein, new signaling from wireless devices to the network, concerning the wireless devices' duty cycle statuses, is defined. This allows the network to optimize its control of the radio resource usage. Additionally, embodiments described herein provide new signalling from the network to wireless devices concerning the network's duty cycle status. This allows wireless devices to optimize their idle mode operation, including decisions whether to request a connection setup or remain in idle mode. Embodiments described and claimed herein provide a set of simple methods for operating a cellular system in a duty cycle controlled radio frequency band.

One embodiment relates to a first method, performed by a wireless device, of operating in a wireless communication network according to a duty cycle. The wireless device attempts to receive from the network a system access information message including information regarding duty cycle operation. If the wireless device receives the system access information message, it signals to the network at least an uplink transmission budget specifying a remaining time the wireless device can transmit within its duty cycle, in accordance with the system access information transmitted by the network.

Another embodiment relates to a wireless device operative in a wireless communication network according to a duty cycle. The wireless device includes communication circuitry and processing circuitry operatively connected to the communication circuitry. The processing circuitry is adapted to attempt to receive from the network a system access information message including information regarding duty cycle operation; and if the wireless device receives the broadcast message, signal to the network at least an uplink transmission budget specifying the time the wireless device can transmit within its duty cycle, in accordance with the system access information broadcast by the network.

Yet another embodiment relates to a second method, performed by a base station, of operating in a wireless communication network according to a duty cycle. The base station transmits to one or more wireless devices a system access information message including information regarding duty cycle operation. The base station receives from a wireless device at least an uplink transmission budget specifying a remaining time the wireless device can transmit within its duty cycle, in accordance with the system access information transmitted by the network.

Still another embodiment relates to a base station operative in a wireless communication network according to a duty cycle. The base station includes communication circuitry and processing circuitry operatively connected to the communication circuitry. The processing circuitry is adapted to transmit to one or more wireless devices a system access information message including information regarding duty cycle operation; and receive from a wireless device at least an uplink transmission budget specifying a remaining time the wireless device can transmit within its duty cycle, in accordance with the system access information transmitted by the network.

Still another embodiment relates to a third method, performed by a base station, of operating in a cell of a wireless communication network according to a duty cycle. The base station transmits to at least one wireless device information regarding a duty cycle limitation on network activity in the cell. The base station limits downlink transmissions in the cell in accordance with the duty cycle limitation.

Still another embodiment relates to a base station operative in a wireless communication network according to a duty cycle. The base station includes communication circuitry and processing circuitry operatively connected to the communication circuitry. The processing circuitry is adapted to transmit to at least one wireless device information regarding a duty cycle limitation on network activity in the cell; and limit downlink transmissions in the cell in accordance with the duty cycle limitation.

Still another embodiment relates to a fourth method, implemented in a communication system including a host computer, a base station and a user equipment (UE). The method includes, at the host computer, receiving, from the base station, user data originating from a transmission which the base station has received from the UE, wherein the UE performs any of the steps of the first method.

Still another embodiment relates to a communication system including a host computer. The communication system includes a communication interface configured to receive user data originating from a transmission from a user equipment (UE) to a base station. The UE comprises a radio interface and processing circuitry, the UE's processing circuitry configured to perform any of the steps of the first method.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
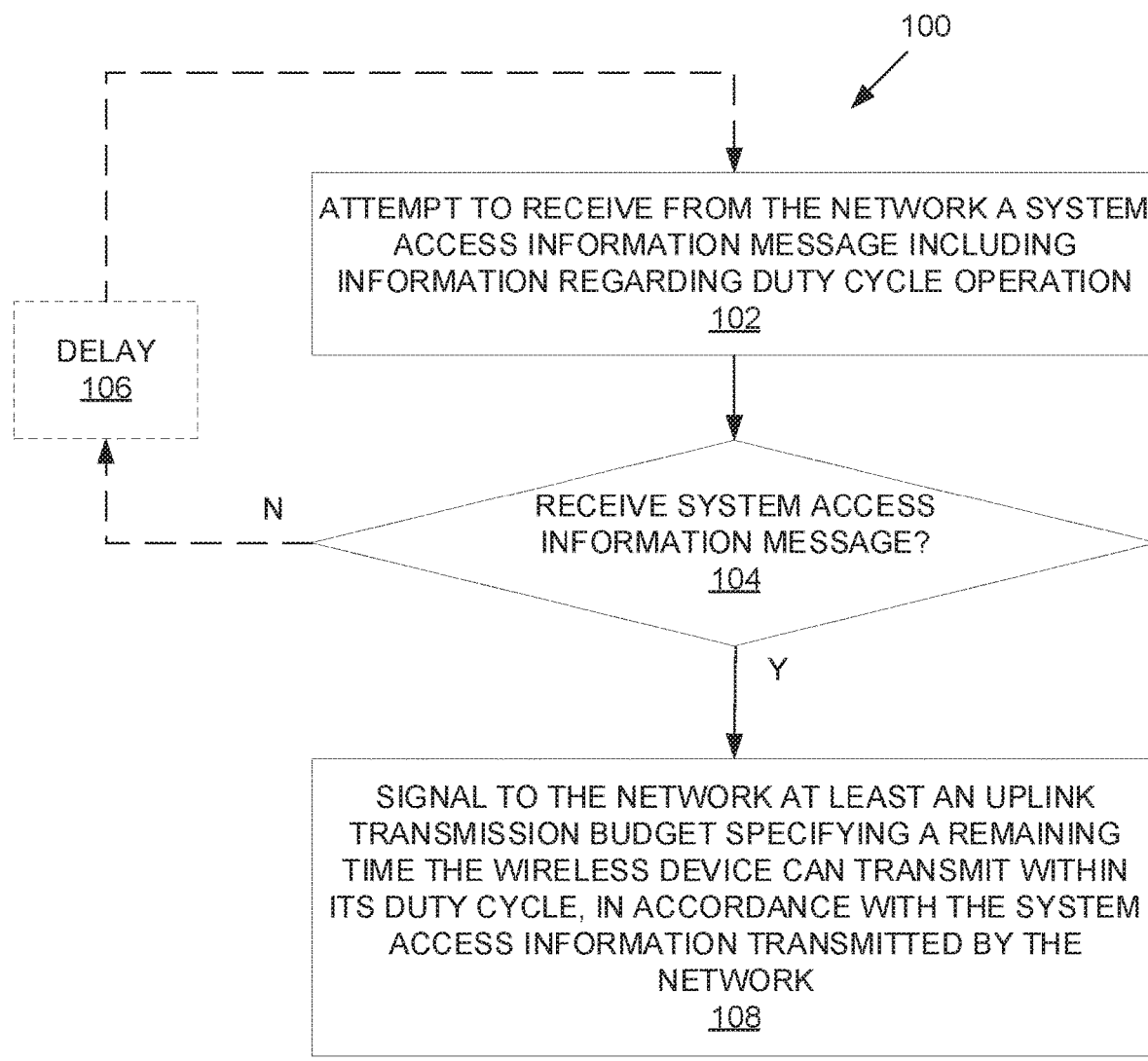
FIG. 1 is a flow diagram of a method of operating a wireless device in a wireless communication network according to a duty cycle.

FIG. QQ1 is a block diagram of a network and some network components.

FIG. QQ2 is a block diagram of a User Equipment.

FIG. QQ3 is a schematic block diagram illustrating a virtualization environment.

FIG. QQ4 illustrates a telecommunication network connected via an intermediate network to a host computer.

FIG. QQ5 illustrates host computer communicating via a base station with a user equipment over a partially wireless connection.

FIG. QQ6 is a flowchart illustrating a host computer communicating with a UE in a communication system.

FIG. QQ7 is a flowchart illustrating a host computer communicating with a UE in a communication system.

FIG. QQ8 is a flowchart illustrating a UE communicating with a host computer in a communication system.

FIG. QQ9 is a flowchart illustrating communication between a base station and a host computer in a communication system.

DETAILED DESCRIPTION

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

As known in the art, wireless devices may communicate (in the user or control planes) with a variety of network nodes in the Core Network. All such transmissions occur via a base station in the Radio Access Network. Accordingly, descriptions herein of communication between a wireless device and "the network" are understood to entail radio communications between the wireless device and a base station. Similarly, restrictions imposed on "the network," such as duty cycle restrictions, are understood to apply to transmissions from a base station.

Wireless Device Duty Cycle Restrictions

In one embodiment a wireless device—which may also include User Equipment (UE)-signals, during the connection setup to the network, its uplink transmission budget. The uplink transmission budget is herein defined as a remaining time a wireless device may transmit before its duty cycle restricts further transmission. It can be expressed, e.g., in terms of subframes, time/frequency radio units such as Physical Resource Blocks (PRB), or as a percentage of the remaining duty cycle. As one example, the wireless device may use the RRC Connection/Resume Request message (also known as Msg3) to convey this information.

The uplink transmission budget reporting can be given, for example, for a specified absolute time window (e.g., every full hour) or be given for a sliding window, in case a relative timing reference should be given. The wireless device can provide its remaining uplink transmission budget together with an absolute time stamp. This indicates how much of the budget is left after the indicated time. It does not allow the network to derive the detailed duty cycle usage in the past, and thus, is a conservative approach. However, it is simple and reduces the signaling overhead. If provided periodically, this will provide the network with sliding window information.

In one embodiment, the network transmits, to one or more wireless devices, a system access information message, which includes a set of rules for configuring the wireless device reporting. The system access information message may be broadcast. The network may, e.g., indicate that wireless devices with an uplink transmission budget less than a certain threshold X must report their uplink transmission budgets to the network during the connection setup.

Periodic reporting—where the wireless device is required to report its uplink transmission budget with a certain periodicity—is yet an example of a network configuration for wireless device reporting.

In one embodiment, the network couples the wireless device uplink transmission budget reporting to the coverage enhancement level of the wireless device. Note that a NB-IoT device in poor coverage uses repeated transmission to improve the link budget, which is costly from a duty cycle perspective.

In one embodiment, the network broadcasts a set of duty cycle based barring conditions. Wireless devices with an uplink transmission budget less than Y may be barred from accessing the system. Also, the barring condition may be made coverage enhancement (CE) level specific, with a separate barring condition specified for each CE level.

In one embodiment, the wireless device uses an internal threshold (or a threshold fixed in a specification, or broadcast by the network) to evaluate its uplink transmission budget. If the budget is below this threshold, only high priority uplink traffic is permitted to be served immediately. Traffic with lower priority is deferred to the next duty cycle observation period. Some regulations for duty cycle limited networks permit acknowledgments for data transmission (e.g., HARQ ACK/NAKs) to be budgeted either on the transmitter side or on the receiver side. In one embodiment, when the wireless device detects that its uplink transmission budget is less than an applicable threshold and there is uplink data to transmit, it requests in the connection setup for the base station to account for the (ACK/NAKs). Furthermore, if the network has broadcast its own duty cycle budget and it is below a threshold, the wireless device may decide not to request the network to account for its (wireless device) ACK/NAK transmissions.

FIG. 1 depicts a method 100, performed by a wireless device, of operating in a wireless communication network according to a duty cycle, in accordance with particular embodiments. The wireless device attempts to receive from the network a system access information message including information regarding duty cycle operation (block 102). If the network is not transmitting system access information, such as due to duty cycle restrictions on the base station, and hence the wireless device does not receive the transmitted message (block 104), then the wireless device may delay a predetermined duration (block 106), and again attempt to receive a system access information message (block 102). The delay and re-try are not essential steps of the method 100, as indicated by dashed lines. If the wireless device receives the system access information message (block 104), it signals to the network at least an uplink transmission budget (block 108). The uplink transmission budget specifies a remaining time the wireless device can transmit within its duty cycle. The signalling of the uplink transmission budget is done in accordance with the system access information (e.g., duty cycle reporting configuration information) transmitted by the network.

Figure 2:
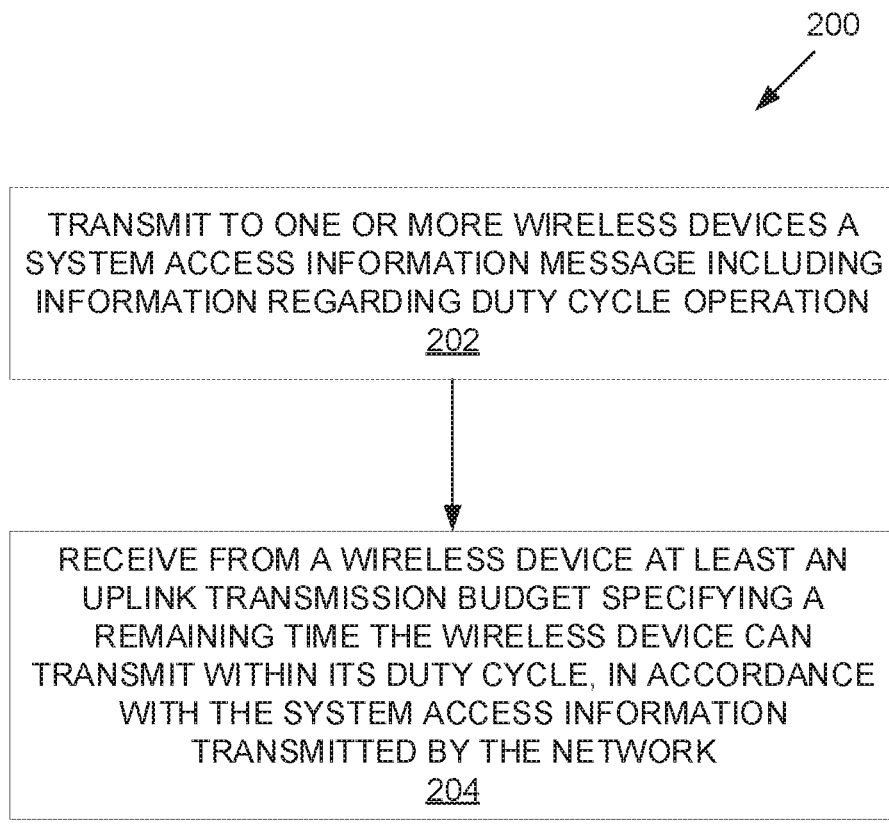
FIG. 2 is a flow diagram of a first method of operating a base station in a wireless communication network according to a duty cycle.

FIG. 2 depicts a method 200, performed by a base station, of operating in a cell of a wireless communication network according to a duty cycle, in accordance with other particular embodiments. The base station transmits to one or more wireless devices a system access information message including information regarding duty cycle operation (block 202). The base station then receives, from a wireless device, at least an uplink transmission budget (block 204). The uplink transmission budget specifies a remaining time the wireless device can transmit within its duty cycle. The wireless device signalling is in accordance with the system access information broadcast by the network.

Note that apparatuses described herein may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 3:
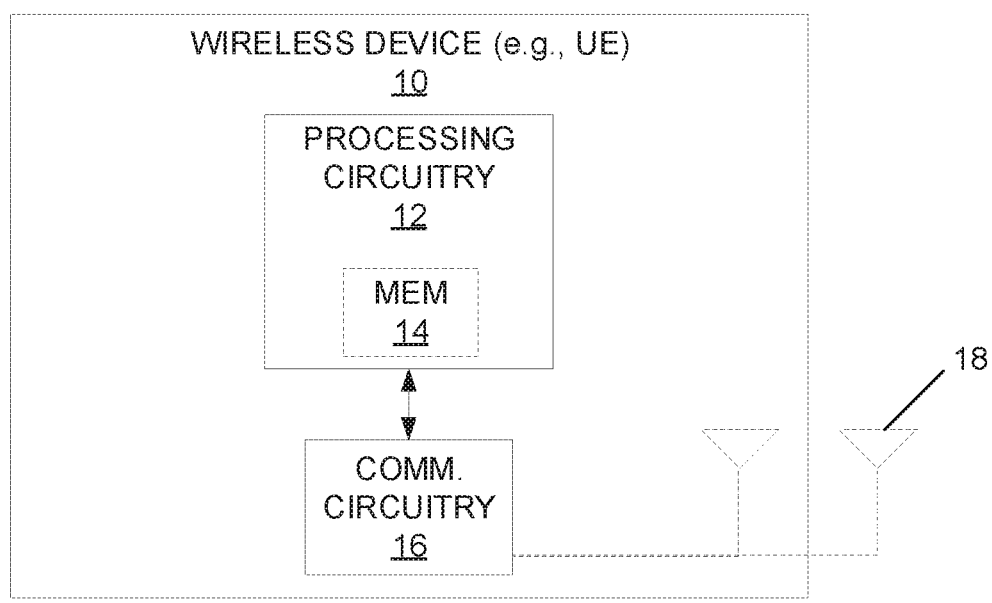
FIG. 3 is a hardware block diagram of a wireless device.

FIG. 3 for example illustrates a wireless device 10 as implemented in accordance with one or more embodiments. As shown, the wireless device 10 includes processing circuitry 12 and communication circuitry 16. The communication circuitry 16 (e.g., radio circuitry such as a transceiver) is configured to transmit and/or receive information to and/or from one or more other nodes, e.g., via any communication technology. Such communication may occur via one or more antennas 18 that are either internal or external to the wireless device 10. The processing circuitry 12 is configured to perform processing described above, such as by executing instructions stored in memory 14. The processing circuitry 12 in this regard may implement certain functional means, units, or modules, which may for example implement the method 100.

Figure 4:
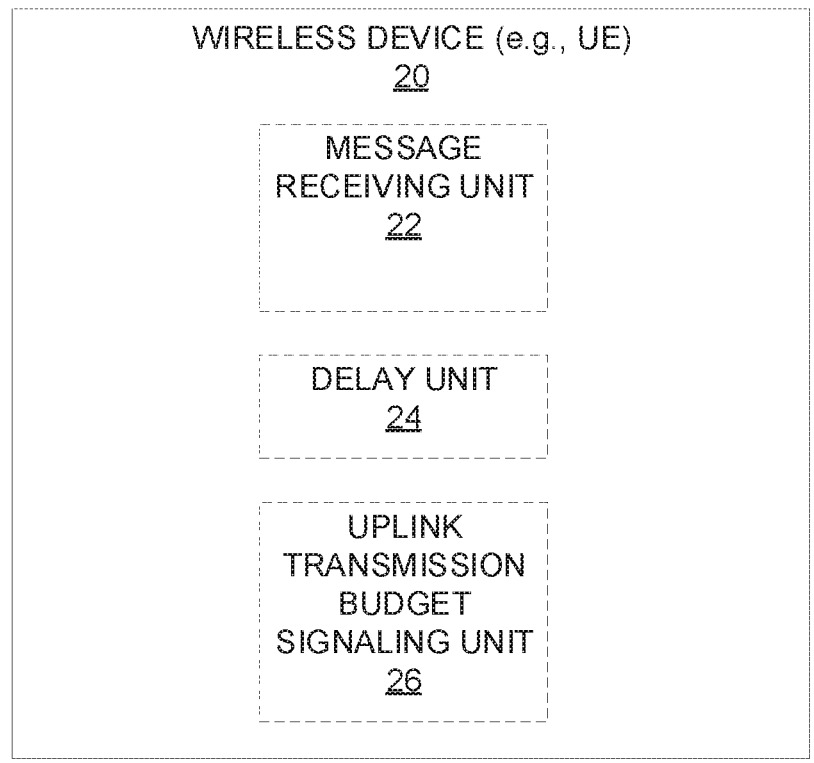
FIG. 4 is a functional block diagram of a wireless device.

FIG. 4 illustrates a schematic block diagram of a wireless device 20 in a wireless network according to still other embodiments (for example, the wireless network shown in FIG. QQ1). As shown, the wireless device 20 implements various functional means, units, or modules, e.g., via the processing circuitry 12 in FIG. 3 and/or via software code. These functional means, units, or modules, e.g., for implementing the method(s) herein, include for instance: message receiving unit 22, delay unit 24, and uplink transmission budget signalling unit 26. Message receiving unit 22 is configured to attempt to receive from the network a system access information message including information regarding duty cycle operation. Optional means, unit, or module delay unit 24 is configured to delay a predetermined duration before again attempting to receive a system access information message including information regarding duty cycle operation, if the wireless device does not initially receive such a message. Uplink transmission budget signalling unit 26 is configured to, if the wireless device receives the broadcast message, signals to the network at least an uplink transmission budget specifying a remaining time the wireless device can transmit within its duty cycle, in accordance with the system access information transmitted by the network.

Figure 5:
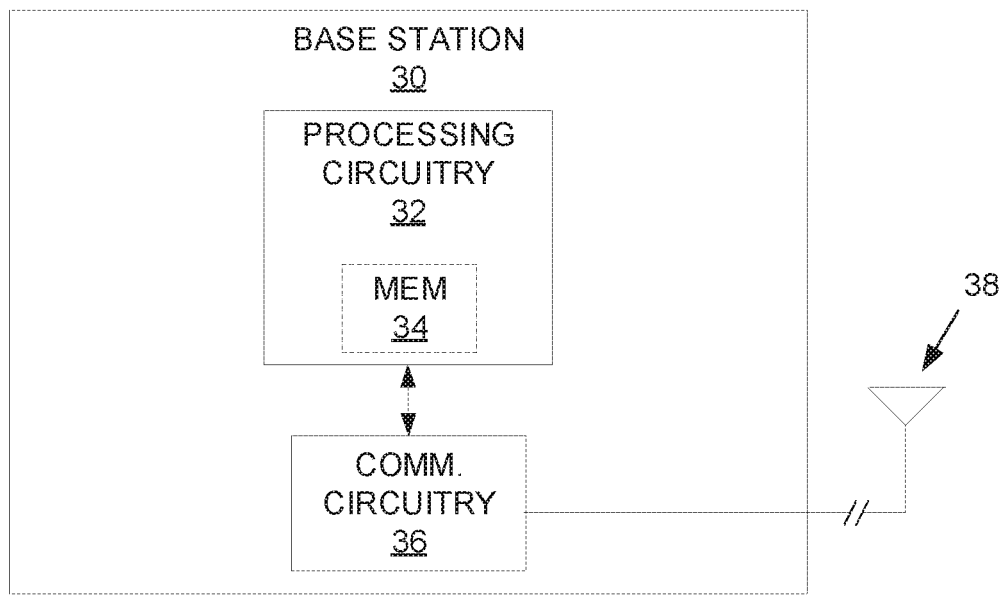
FIG. 5 is a hardware block diagram of a base station.

FIG. 5 illustrates a base station 30 as implemented in accordance with one or more embodiments. As shown, the base station 30 includes processing circuitry 32 and communication circuitry 36. The communication circuitry 36 is configured to transmit and/or receive information to and/or from one or more other nodes, e.g., via any communication technology. The processing circuitry 32 is configured to perform processing described above, such as by executing instructions stored in memory 34. The processing circuitry 32 in this regard may implement certain functional means, units, or modules, which may for example implement the method 200. The communication circuitry 36 additionally includes radio communication circuits such as a transceiver operatively connected to one or more antennas 38. As indicated by the broken connection, the antenna(s) may be located remotely, such as on a tower or building.

Figure 6:
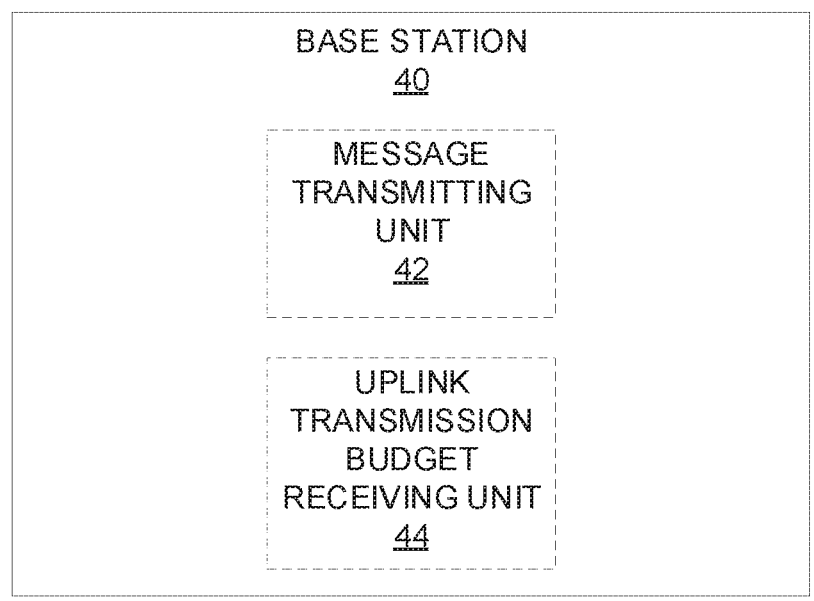
FIG. 6 is a first functional block diagram of a base station.

FIG. 6 illustrates a schematic block diagram of a base station 40 in a wireless network according to still other embodiments (for example, the wireless network shown in FIG. QQ1). As shown, the base station 40 implements various functional means, units, or modules, e.g., via the processing circuitry 32 in FIG. 5 and/or via software code. These functional means, units, or modules, e.g., for implementing the method(s) herein, include for instance: message transmitting unit 42 and uplink transmission budget receiving unit 44. Message transmitting unit 42 is configured to transmit to one or more wireless devices a system access information message including information regarding duty cycle operation. Uplink transmission budget receiving unit 44 is configured to receive from a wireless device at least an uplink transmission budget specifying a remaining time the wireless device can transmit within its duty cycle, in accordance with the system access information transmitted by the network.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Network Wireless Duty Cycle Restrictions

As discussed above, in addition to wireless devices (or alternatively), one or more base stations in a wireless communication network may be assigned a duty cycle, which limites its transmissions in the downlink direction. Within a given cell, this duty cycle is also referred at the "network's" duty cycle. In one embodiment, the network signals to the wireless devices in a cell, either by broadcast or dedicated signaling, that it can no longer support access due to duty cycle restrictions assigned to the base station. It may in addition signal a backoff indicator to the wireless devices, which indicates when it expects to resume its normal operation.

In one embodiment, the network indicates to the wireless devices that it will not transmit paging messages due to a duty cycle limitation. A timer value may be broadcast to indicate when the network will resume the paging.

In one embodiment, the network reduces its operation to a bare minimum, and uses this reduced transmission to signal the status of its duty cycle restriction to the wireless devices. In one embodiment, the base station transmits, e.g., only the Narrowband Primary and Secondary synchronization signals (NPSS and NSSS) but not the Narrowband Physical Broadcast Channel (NPBCH) or the System Information (SI) messages. The absence of the NPBCH or SI transmissions indicates to the wireless devices that the network is not accessible for the time being. As wireless devices in connected mode do not need to read System Information, they can continue with normal operation.

In a variant of this embodiment, the network indicates that it can no longer support access, due to duty cycle restrictions, in the Master Information Block (MIB) transmitted in the NPBCH. This effectively suspends all other idle mode channels, such as PDSCH transmission carrying SI, paging messages, and PDCCH messages for support of paging and random access response.

As used herein, the term "system access information" includes information contained in dedicated signalling, or in the MIB, SI, or Broadcast Channel, that is necessary for a wireless device to proceed to a connection setup procedure to gain access to the network. Such information includes, inter alia, system bandwidth, antenna configuration, system frame number, and the like. "System access information" may or may not include information directed to wireless device duty cycle reporting rules or requirements. If wireless device duty cycle reporting information is included in system access information transmitted (e.g., by broadcast) by the network, newly connecting wireless devices are expected to act in accordance with such information.

In one embodiment, if for example the base station is duty cycle limited and is receiving uplink data from a wireless device, the network indicates to the wireless device that the wireless device shall account for ACK/NACK transmissions from the base station in the wireless device duty cycle. Furthermore, the network can account for wireless device ACK/NACK uplink transmissions in the base station's duty cycle, if for example the wireless device has reported low remaining duty cycle.

Figure 7:
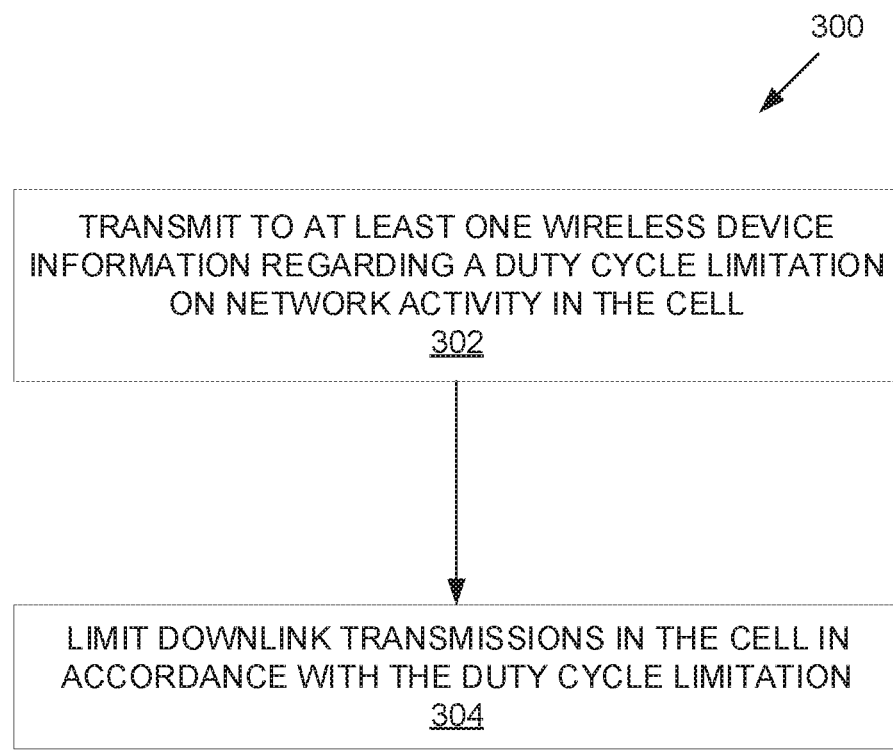
FIG. 7 is a flow diagram of a second method of operating a base station in a wireless communication network according to a duty cycle.

FIG. 7 depicts a method 300, performed by a base station, of operating in a wireless communication network according to a duty cycle, in accordance with particular embodiments. The base station transmits to at least one wireless device information regarding a duty cycle limitation on network activity in the cell (block 302). The base station then limits downlink transmissions in the cell in accordance with the duty cycle limitation (block 304).

The base station 30 depicted in FIG. 5 may implement the method 300 (alternatively or in addition to the method 200), for example, via the processing circuitry 32.

Figure 8:
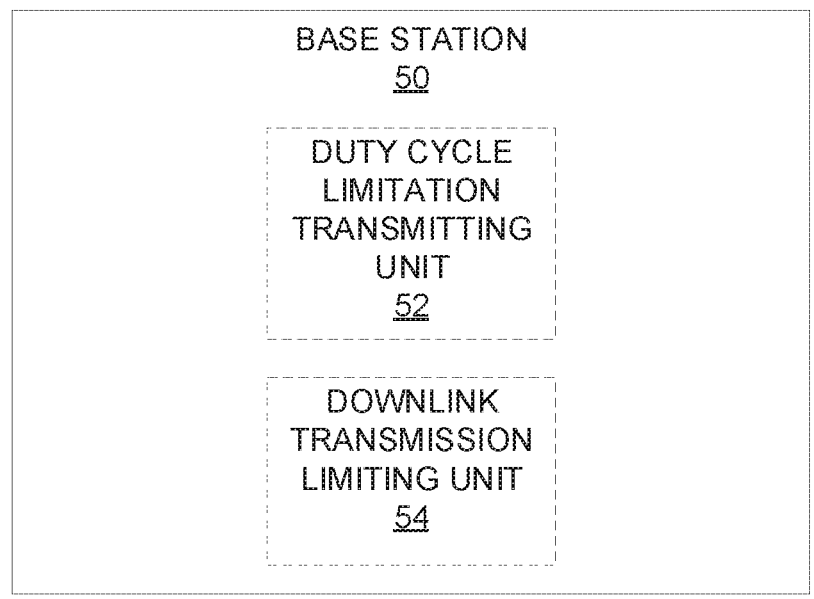
FIG. 8 is a second functional block diagram of a base station.

FIG. 8 illustrates a schematic block diagram of an base station 50 in a wireless network according to still other embodiments (for example, the wireless network shown in FIG. QQ1). As shown, the base station 50 implements various functional means, units, or modules, e.g., via the processing circuitry 32 in FIG. 5 and/or via software code. These functional means, units, or modules, e.g., for implementing the method(s) herein, include for instance: duty cycle limitation transmitting unit 52 and downlink transmission limiting unit 54. Duty cycle limitation transmitting unit 52 is configured to transmit to at least one wireless device information regarding a duty cycle limitation on network activity in the cell. Downlink transmission limiting unit 54 is configured to limit downlink transmissions in the cell in accordance with the duty cycle limitation.

Advantages of Embodiments of the Present Invention

Certain embodiments may provide one or more of the following technical advantage(s), as compared to the prior art. Embodiments described herein support spectrally efficient cellular operation in a spectrum associated with duty cycle restrictions. For example, considerable network "overhead" signalling may be eliminated, which would otherwise occur when one or both of wireless devices and a base station network node simply cease transmissions due to having exhausted their respective duty cycle budgets.

Wireless Network Description and Over-The-Top (OTT) Transmissions

Although the subject matter described herein may be implemented in any appropriate type of system using any suitable components, the embodiments disclosed herein are described in relation to a wireless network, such as the example wireless network illustrated in FIG. QQ1. For simplicity, the wireless network of FIG. QQ1 only depicts network QQ106, network nodes QQ160 and QQ160b, and WDs QQ110, QQ110b, and QQ110c. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. QQ1, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. QQ1 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated. Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. QQ1 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (VVD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

FIG. QQ2 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. QQ2, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. QQ2 is a UE, the components discussed herein are equally applicable to a WD, and vice-versa.

In FIG. QQ2, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof.

Storage medium QQ221 includes operating system QQ223, application program QQ225, and data QQ227. In other embodiments, storage medium QQ221 may include other similar types of information. Certain UEs may utilize all of the components shown in FIG. QQ2, or only a subset of the components. The level of integration between the components may vary from one UE to another UE. Further, certain UEs may contain multiple instances of a component, such as multiple processors, memories, transceivers, transmitters, receivers, etc.

In FIG. QQ2, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. QQ2, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. QQ2, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, W-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a W-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

FIG. QQ3 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. QQ3, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. QQ3.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

FIG. QQ4 illustrates a telecommunication network connected via an intermediate network to a host computer in accordance with some embodiments. In particular, with reference to FIG. QQ4, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. QQ4 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Example implementations, in accordance with an embodiment, of the UE, base station and host computer discussed in the preceding paragraphs will now be described with reference to FIG. QQ5. FIG. QQ5 illustrates host computer communicating via a base station with a user equipment over a partially wireless connection in accordance with some embodiments In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. QQ5) served by base station QQ520. Communication interface QQ526 may be configured to facilitate connection QQ560 to host computer QQ510. Connection QQ560 may be direct or it may pass through a core network (not shown in FIG. QQ5) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. QQ5 may be similar or identical to host computer QQ430, one of base stations QQ412a, QQ412b, QQ412c and one of UEs QQ491, QQ492 of FIG. QQ4, respectively. This is to say, the inner workings of these entities may be as shown in FIG. QQ5 and independently, the surrounding network topology may be that of FIG. QQ4.

In FIG. QQ5, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may improve the handling of duty cycles in certain spectrum, and thereby provide benefits such as better traffic control and more efficient spectrum utilization.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

FIG. QQ6 is a flowchart illustrating a method implemented in a communication system, in accordance with one embodiment. The communication system includes a host computer, a base station and a UE which may be those described with reference to FIGS. QQ4 and QQS. For simplicity of the present disclosure, only drawing references to FIG. QQ6 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

FIG. QQ7 is a flowchart illustrating a method implemented in a communication system, in accordance with one embodiment. The communication system includes a host computer, a base station and a UE which may be those described with reference to FIGS. QQ4 and QQ5. For simplicity of the present disclosure, only drawing references to FIG. QQ7 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

FIG. QQ8 is a flowchart illustrating a method implemented in a communication system, in accordance with one embodiment. The communication system includes a host computer, a base station and a UE which may be those described with reference to FIGS. QQ4 and QQ5. For simplicity of the present disclosure, only drawing references to FIG. QQ8 will be included in this section. In step QQ810

(which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

FIG. QQ9 is a flowchart illustrating a method implemented in a communication system, in accordance with one embodiment. The communication system includes a host computer, a base station and a UE which may be those described with reference to FIGS. QQ4 and QQ5. For simplicity of the present disclosure, only drawing references to FIG. QQ9 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa.

Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method, performed by a wireless device, of operating in a wireless communication network according to a duty cycle, the method comprising:
attempting to receive from the network a system access information message including information regarding the duty cycle, wherein the duty cycle is a limited ratio of an accumulated transmission duration in unlicensed spectrum as imposed on the wireless device within an observation interval; and
in response to receiving the system access information message, signaling to the network at least an uplink transmission budget specifying a remaining time the wireless device can transmit within the observation interval of its current duty cycle, in accordance with the system access information transmitted by the network.

2. The method of claim 1 wherein the system access information message is broadcast by the network, and wherein the duty cycle is expressed as a percentage of the limited accumulated transmission duration within an observation interval.

3. The method of claim 1 wherein signaling to the network at least an uplink transmission budget comprises signaling the uplink transmission budget to the network in a RRC Connection Request or RRC Resume Request message as part of a connection establishment procedure.

4. The method of claim 1 wherein the uplink transmission budget comprises one of a number of subframes, a number of time/frequency radio units, or a percentage of a remaining duty cycle of the wireless device.

5. The method of claim 1 wherein the uplink transmission budget is specified for one of an absolute time window, relative to a timing reference, and a sliding time window.

6. The method of claim 1 wherein the system access information message transmitted by network includes a set of rules for configuring device duty cycle reporting, and wherein the set of rules comprises one or more of:
a rule specifying an uplink transmission budget reporting periodicity for one or more wireless devices; and
a rule specifying uplink transmission budget reporting as a function of a coverage enhancement level of a wireless device.

7. The method of claim 1 wherein the system access information message from the network includes a set of rules for configuring one or more wireless devices, and wherein the set of rules comprises one or more of:
 a rule barring a wireless device having a duty cycle budget less than a first threshold from accessing the network; and
 a rule barring a wireless device from accessing the network in dependence on its coverage enhancement level.

8. The method of claim 1 further characterized by:
 if an uplink transmission budget for the wireless device is below a second threshold, only transmitting uplink traffic to the network if the traffic has a priority exceeding a third threshold.

9. The method of claim 1 further characterized by, if an uplink transmission budget for the wireless device is below a fourth threshold, requesting the network to account for HARQ acknowledgements in the network's duty cycle.

10. The method of claim 1 further characterized by:
 receiving from the network a request that the wireless device account for HARQ acknowledgements in the wireless device's duty cycle; and
 upon transmitting uplink traffic to the network, accounting for HARQ acknowledgements from the network in the wireless device's duty cycle.

11. A wireless device operative in a wireless communication network according to a duty cycle, comprising, communication circuitry; and
 processing circuitry operatively connected to the communication circuitry, and adapted to:
  attempt to receive from the network a system access information message including information regarding the duty cycle, wherein the duty cycle is a limited ratio of an accumulated transmission duration in unlicensed spectrum as imposed on the wireless device within an observation interval; and
  in response to receiving the broadcast message, signal to the network at least an uplink transmission budget specifying the time the wireless device can transmit within the observation interval of its current duty cycle, in accordance with the system access information broadcast by the network.

12. A method, performed by a base station, of operating in a wireless communication network according to a duty cycle, the method comprising the steps of,
 transmitting to one or more wireless devices a system access information message including information regarding the duty cycle, wherein the duty cycle is a limited ratio of an accumulated transmission duration in unlicensed spectrum as imposed on the wireless device within an observation interval; and
 receiving from a wireless device at least an uplink transmission budget specifying a remaining time the wireless device can transmit within the observation interval of its current duty cycle, in accordance with the system access information transmitted by the network.

13. The method of claim 12 wherein transmitting to one or more wireless devices a system access information message comprises broadcasting the system access information message, and wherein the duty cycle is expressed as a percentage of the limited accumulated transmission duration within an observation interval.

14. The method of claim 12, wherein receiving from the wireless device at least an uplink transmission budget comprises receiving the uplink transmission budget in a RRC Connection Request or RRC Resume Request message as part of a connection setup procedure.

15. The method of claim 12, wherein the uplink transmission budget comprises one of a number of subframes, a number of time/frequency radio units, and a percentage of a remaining duty cycle of the wireless device.

16. The method of claim 12, wherein the uplink transmission budget is specified for one of an absolute time window, relative to a timing reference, and a sliding time window.

17. The method of claim 12, wherein the system access information transmitted by the network includes a set of rules for configuring device uplink transmission budget reporting, and wherein the set of rules comprises one or more of:
 a rule specifying an uplink transmission budget reporting periodicity for one or more wireless devices; and
 a rule specifying uplink transmission budget reporting as a function of a coverage enhancement level of a wireless device.

18. The method of claim 12, wherein the system access information transmitted by the network includes a set of rules for configuring one or more wireless devices, and wherein the set of rules comprises one or more of:
 a rule barring a wireless device having an uplink transmission budget less than a first threshold from accessing the network; and
 a rule barring a wireless device from accessing the network in dependence on its coverage enhancement level.

19. The method of claim 12, further characterized by:
 receiving a request from a wireless device to account for HARQ acknowledgements;
 sending downlink traffic to the wireless device; and
 accounting for HARQ acknowledgements from the wireless device in the network's duty cycle.

20. A base station operative in a wireless communication network according to a duty cycle, comprising,
 communication circuitry; and
 processing circuitry operatively connected to the communication circuitry and adapted to
  transmit to one or more wireless devices a system access information message including information regarding the duty cycle, wherein the duty cycle is a limited ratio of an accumulated transmission duration in unlicensed spectrum as imposed on the wireless devices within an observation interval; and
  receive from a wireless device at least an uplink transmission budget specifying a remaining time the wireless device can transmit within the observation interval of its current duty cycle, in accordance with the system access information transmitted by the network.

* * * * *